United States Patent Office 2,997,742
Patented Aug. 29, 1961

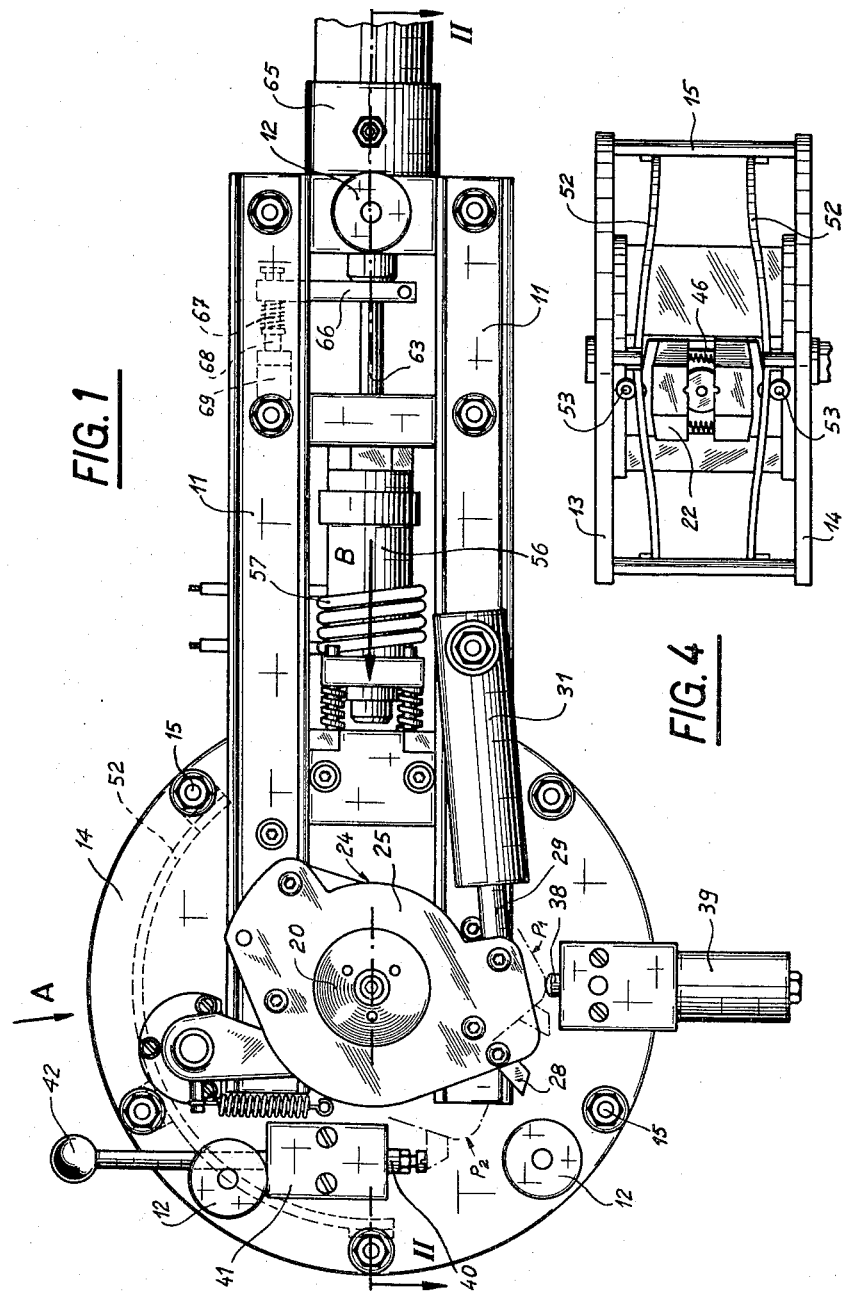

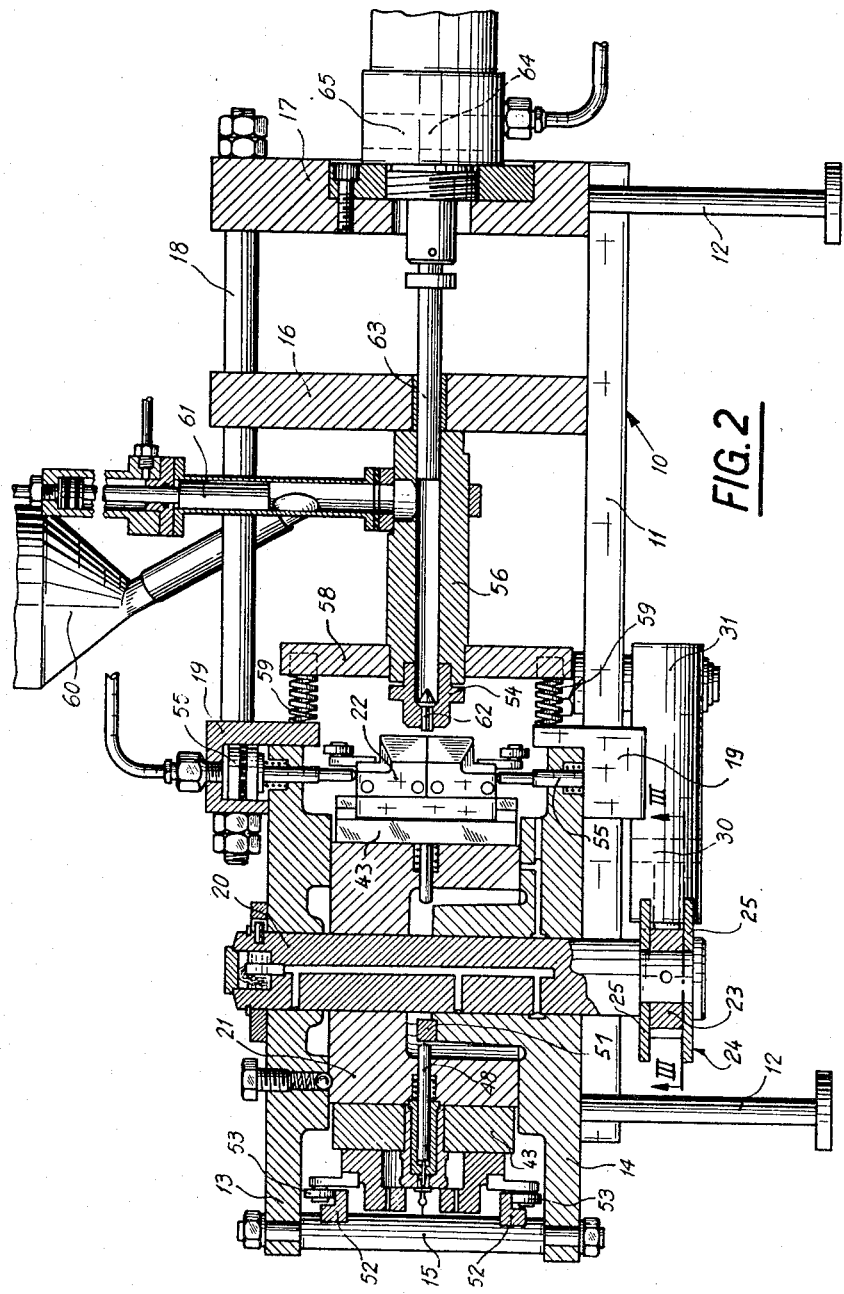

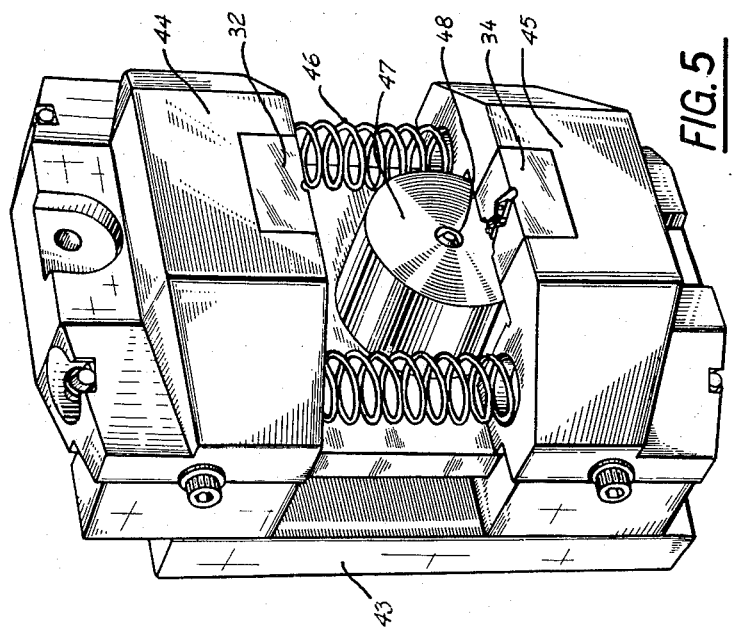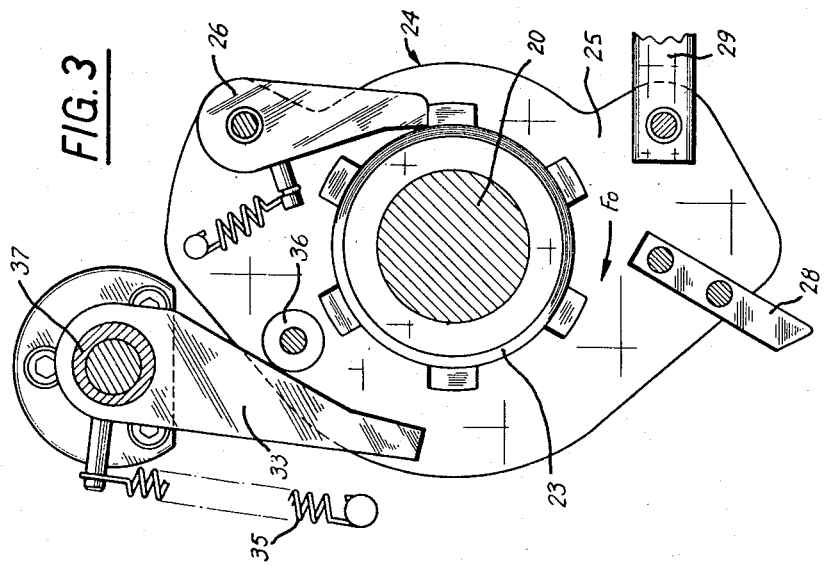

2,997,742
ROTARY MACHINE FOR THE SERIES INJECTION OF SMALL PARTS OF PLASTIC MATERIAL PROVIDED WITH METAL INSERTS
Andre Mieville, Lausanne, Switzerland, assignor to Mecanique et Plastique S.A., Geneva, Switzerland, a corporation of Switzerland
Filed July 29, 1960, Ser. No. 46,259
Claims priority, application Switzerland Mar. 2, 1960
5 Claims. (Cl. 18—30)

My invention has for its object a rotary machine for the injection in series of small parts of plastic material provided with metal inserts.

The machine according to my invention includes a revolving support carrying a series of molds, a mechanism imparting an intermittent rotary movement to said support, an injecting station and a station for unloading the molded drills or the like members, which stations are positioned at the periphery of the support, so that the molds may stop in succession in registry with said stations.

I have illustrated, by way of example, in the accompanying drawing, a preferred embodiment of such a rotary injection. In said drawing:

FIG. 1 is a plan view from below of the machine.

FIGS. 2 and 3 are sectional views through lines II—II of FIG. 1 and III—III of FIG. 2, respectively.

FIG. 4 is an elevational view in the direction of the arrow A of FIG. 1.

FIG. 5 is a perspective view of a mold on a larger scale.

Figures 6, 7:
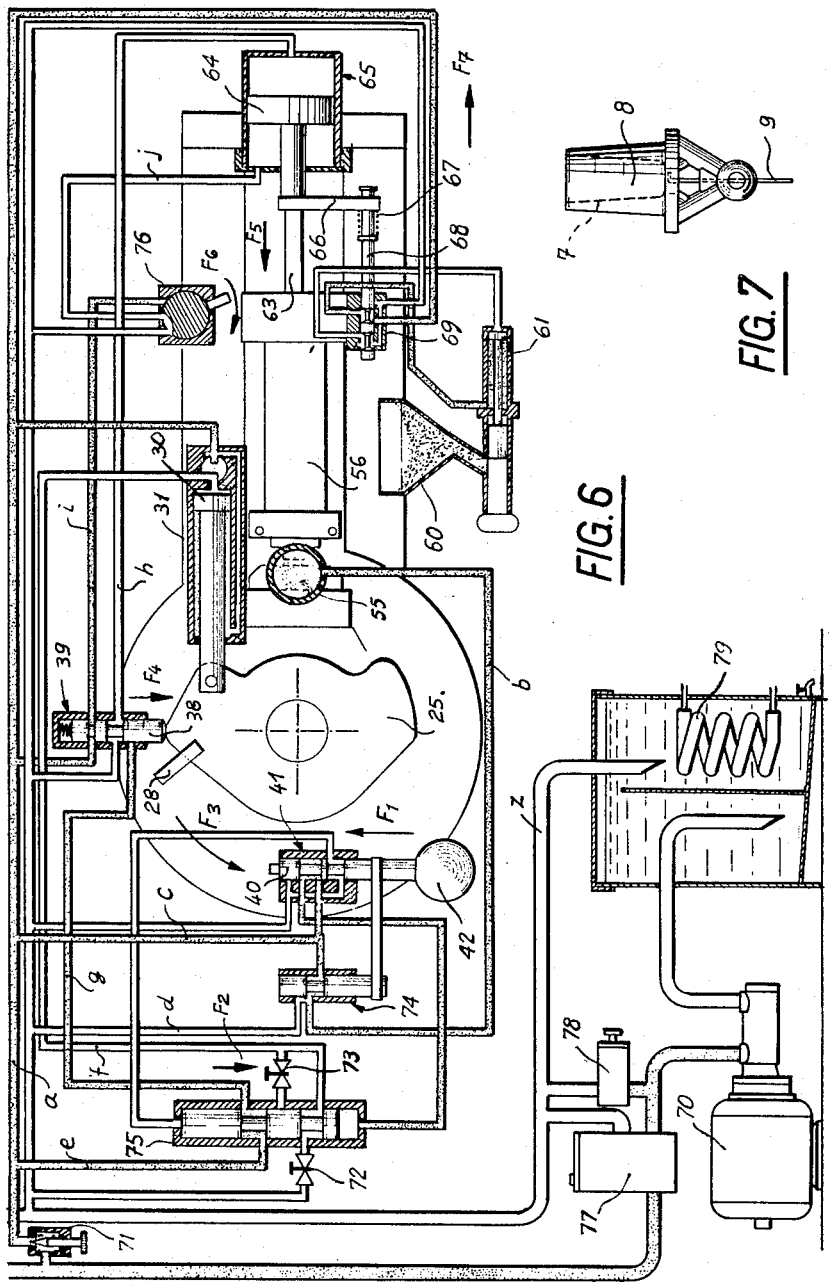
FIG. 6 is a diagrammatic showing of the hydraulic circuit of the machine.
FIG. 7 is an elevational view of the finished molded drill.

The machine illustrated is intended for the mass production through molding of drills of the type described in my copending specification. Said drills include, as shown in FIG. 7, a metal cap 7, a body 8 molded over said cap and a bit 9 of extra-hard metal embedded in said body.

The movable parts of the machine are carried by a frame including a support 10 constituted by two beams 11 provided with feet 12, two circular plates 13 and 14 connected with each other by means of uprights 15 and secured to the support 10, two carrier members 16 and 17 arranged transversely over the beams 11 and two stiffening bars 18.

The plates 13 and 14 form bearings for the shaft 20 of a revolving support 21 provided with six vertical sides carrying each a mold 22. On the lower end of said shaft 20 projecting underneath the plate 14 are mounted a dividing ratchet wheel 23 provided with six teeth and a rotary system 24 including chiefly two plates 25 arranged in superposition. The ratchet wheel 23 is keyed to said shaft 20, while the movable system 24 is loosely mounted on the latter.

The ratchet wheel 23 forms one of the sections of a free wheel coupling, the other section of which is formed, as shown in FIG. 3, by a spring-urged catch 26 pivotally carried between the plates 25 of the movable system. The clutch, when operative, provides a rigid connection between the shaft 20 and said movable system 24 for rotation in the direction of the arrow Fo.

The movable system which includes furthermore a nose 28 on one of the plates is pivotally connected with the rod 29 of a double acting piston 30 sliding inside a cylinder 31 pivotally connected to one of the beams 11. The stroke of said piston corresponds to an angular shifting over slightly more than 60° of the plates 25, so that the catch 26 may, for each oscillation of the latter in one direction, engage the rear side of a further ratchet tooth and make the revolving support 21 progress by one sixth of a revolution. The two extreme angular positions of the movable section 24 are illustrated in dot-and-dash lines in FIG. 1 and are designated by $P_1$ and $P_2$.

The six angular positions of the support 21 are defined in a highly accurate manner by a collapsible stop 33 held by a spring 35 against a pin 36 on the movable system 24, said stop entering simultaneously the path of the ratchet teeth 23 just before said movable system enters its position $P_2$. Said abutment is adjustable through the agency of an eccentric member 37 carrying it.

When the movable system is in the position $P_1$, the lower plate 25 playing the part of a cam urges outwardly the control feeler 38 of the slide valve of a distributor 39, whereas, when the movable system is in the position $P_2$, the nose 28 acts on the pusher member 40 controlling the slide valve of a further distributor 41. Last-mentioned slide valve may also be shifted by hand through the agency of a control rod 42. Said two distributors 39 and 41 are carried by the plate 14 of the frame.

Each mold 22 is constituted, as shown in FIG. 5, by two shells 32 and 34 removably secured to corresponding supports 44 and 45 sliding over a carrier plate 43, while two springs 46 urge the two shells towards each other, the mold comprising furthermore a centering core 47 and a spring-actuated extractor 48.

The intermittent rotations of the revolving support, position the molds in succession at the loading and unloading station and at the injecting station B. At the former of said stations, the extractors 48 are shifted radially by a block 51 and the molds are opened against the action of the spring 46 by two arcuate rails 52 secured to the uprights 15 and over which rollers 53 carried by the supports 44 and 45 are adapted to run. On the other hand, the molds are held at the injection station between two hydraulic jacks 55 adapted to lock them in their closed position.

The injection means include, as shown in FIGS. 2 and 3, a cylindrical chamber 56 provided with a collar 58 engaging, with the interposition of springs 59, the uprights 19 carrying the jacks 55. Said injection chamber, which may be brought to the temperature required for the melting of the injection material by a high frequency heating winding 57 (FIG. 1), is fed through a loading apparatus including a container opening into a hopper 60 and a hydraulic jack 61 urging the material into the chamber 56. The latter is provided at its end with an injection nozzle 54 provided with a closing flap valve 62, the axis of which registers in succession with the six mold cores 46 when the revolving support 21 is driven into a stepwise rotation by the rotary system 24 and the clutch 23—26.

The injection pressure is supplied by a hydraulic press 65, the piston controlling which is designated by 64 and which is carried by the supports 16 and 17. The plunger piston 63 of said press is connected through an arm 66 and its spring 67 with the slide valve 68 of further hydraulic distributor 69 (FIG. 1). The hydraulic control system for the machine (FIG. 6) includes, in addition to the distributors 39, 41 and 69, the cylinder 31, the press 65 and the jacks 55 and 61 already mentioned, a pump 70, a check valve 71, two throttling valves 72 and 73 adapted to adjust respectively the duration of injection and the angular speed of the revolving support, a fourth distributor 75, a fifth distributor 74, of which the slide valve is mechanically coupled with the slide valve of the distributor 41, a three-way manually-controlled valve 76, a pressure regulator 77, a discharge pipe 78 and a cooling worm 79.

The machine operates through a succession of cycles during each of which the revolving support progresses by 60°. The attendant at the loading station has to start the successive cycles and, between said cycles, to remove the molded drills and to position the fittings including the cap 7 and the bit 9 for the next drill.

Between two successive cycles, the hydraulic circuit of the machine is in the condition illustrated in FIG. 6. The control rod 42 is located in its forward position and the position and the pipes drawn as filled with material, are subjected to pressure. The jacks 55 connected with the loading pipes *a* by the pipes *b* and *c* lock the closed mold positioned in front of the injection station.

In order to start operation of the machine, the attendant pushes the member 42 in the direction of the arrow F1, so as to relieve, on the one hand, the jack 55 through the pipes 6d and z and, on the other hand, to shift the slide valve of the distributor 75 in the direction of the arrow F2. Last-mentioned slide valve connects, through pipes *e* and *f* controlled by the throttling valve 73, the rear chamber in the cylinder 31 with the pipe *a*, which produces a shifting towards the left-hand side of the piston 30 and a pivotal movement in the direction of the arrow F3 of the movable system 24, of the ratchet wheel 23 and of the shaft 20. During said pivotal movement, the slide valve 38 moves under the action of its spring in the direction of the arrow F4 and interconnects the pipes *g* and *h*. Slightly before the movable system 24 is held back by the stop 33, the nose 28 returns the slide valves of the distributors 41 and 74 into their starting position, which produces a return of the distributor valve 75 into the position occupied in FIG. 6, the loading of the jacks 55 and the application of pressure through the pipes *g* and *h* to the rear chamber of the press 65.

The piston 63 moves then in the direction of the arrow F5, so as to drive the chamber 56 towards the mold which is ready to receive the injected material, the piston 63 moving in antagonism with the action of the springs 59 which are thus stretched. During this displacement, the flap valve 62 engages the port in the mold and abuts against a shoulder formed in the latter. This uncovers the nozzle 54, so that the injection is initiated.

After a short lapse of time, the duration of which is adjusted by the opening of the throttle valve 72, so as to correspond to the duration of injection, pressure is restored in the front chamber of the cylinder 31. The movable system 24 returns into its starting position, without said movement being transmitted to the revolving support 21, which remains in the position defined by the stop 33. At the moment at which the movable system 24 has reached its starting position, the slide valve 38 is urged back by the cam 25 and disconnects the pipe *g* from the pipe *h* which is then connected with the discharge pipe *z*. The injection chamber returns then into its starting position under the action of the springs 59 which expand and the flap valve 62 closes the nozzle 54. The piston 63 moves rearwardly by the same amount as the chamber 56, while it remains in contact with the material contained in said chamber. Its position given by a reference mark which is not illustrated, allows defining at every moment the amount of material which is still available. During the intermittent progression of the piston 63, the spring 67 is compressed and holds the slide valve 68 in the position illustrated in FIG. 6 so that the piston of the jack 61 is constantly located to the rear of the funnel 60.

When the contents of the injection chamber 56 are no longer sufficient for ensuring a satisfactory injection, means located in registry with the reference mark just referred to actuate a signal which makes the attendant aware of the fact that he should shift the movable member of the reloading manually-controlled valve 76 in the direction of the arrow F6. Said operation has for its result a connection between the pipes *i* and *j*, the pipe *j* opening into the front chamber of the cylinder 65 and urging the piston 63 back into its rearmost position. At the moment at which said position is reached, the arm 66 being shifted in the direction of the arrow F7, allows the spring 67 to expand and drives the slide valve 68 towards the right-hand side of FIG. 6, thereby to reverse the pressure in the jack cylinder 61. The piston of said cylinder moves towards the injection chamber 67 and fills it with further granular particles of plastic material. The receding movement of the piston 63 and the filling of the injection chamber cannot however be performed otherwise than when the injection is at an end since the pipe *i* through which pressure is established in the front chamber of the cylinder 65 is connected with the feed pipe *a* through a passage formed in the distributor 39 which opens only when the slide valve 38 has been pushed back by the cam plate 25.

What I claim is:

1. A rotary machine for the successive molding through injection of a series of small parts of plastic material over metal inserts, comprising a rotary support provided at its periphery with a plurality of equally spaced recesses, a free wheel control system including a section rigid with the support, a second section controlling the first section to shift the latter in a predetermined direction only by successive angles equal to the spacing between two recesses, and driving means adapted to impart to the second section an oscillating movement by an angle equal to said spacing, a mold adapted to carry an insert and fitted in each recess to rotate with the support along an annular path and to stop therewith at the end of each angular shifting in predetermined positions, each mold including two sections adapted to be shifted apart, springs urging the mold sections into engagement, means locking each mold in its closed position when registering with one predetermined position of the molds and including an injection chamber adapted to be shifted radially towards the mold registering with said injecting station to engage the mold, means feeding plastic material into said chamber, an injection nozzle at the end of the chamber facing the mold registering with the station, a flap valve closing said nozzle and adapted to be shifted into an inoperative position upon engagement of the chamber with said mold, means urging the chamber towards the cooperating mold, and an injecting press urging the material through the chamber and nozzle into the mold, a stationary unloading and reloading station facing another predetermined position of the molds and including means for opening the successive molds said station to allow removal of the molded part formed therein and introduction into the mold of the insert over which a part is to be molded, means for urging the two sections of each mold together at the injecting station and during the travel of said mold from the injecting station to the unloading station, a hydraulic system controlling the driving means, the injecting press, the feeding means, and the locking means, and two distributors inserted in the hydraulic circuit, controlled by the second section of the free wheel clutch and controlling the cycle including in succession the angular movement of the support by one elementary recess spacing to shift a mold into registry with the injecting section, the locking in its closed position of the mold registering with the injecting station and the operation of the components of the injection station.

2. A rotary machine for the successive molding through injection of a series of small parts of plastic material over metal inserts, comprising a rotary support provided at its periphery with a plurality of equally spaced recesses, a free wheel control system including a section rigid with the support, a second section controlling the first section to shift the latter in a predetermined direction only by successive angles equal to the spacing between two recesses, driving means adapted to impart to the second section an oscillating movement by an angle equal to said spacing, a mold adapted to carry an insert and fitted in each recess to rotate with the support along an annular path and to stop therewith at the end of each angular shifting in predetermined positions, each mold including two sections adapted to be shifted apart, springs urging the mold sections into engagement, means locking each mold in its closed condition when registering with one predetermined position, a stationary injection station facing the mold in last predetermined position and including an injection chamber, means shifting the latter radially towards the mold registering with said injecting station to engage said mold, means feeding plastic material into said chamber, an injection nozzle at the end of the chamber facing the mold registering with the station, a flap valve closing said nozzle and adapted to be shifted into an inoperative position upon engagement of the chamber with said mold, an injecting press urging the material through the chamber and nozzle into the mold, a stationary unloading and reloading station facing another predetermined position of the molds and including means for opening the successive molds at said station to allow removal of the molded part formed therein and introduction into the mold of the insert over which a part is to be molded, means for urging the two sections of each mold together at the injecting station and during the travel of said mold from the injecting station to the unloading station, a hydraulic system controlling the driving means, the injecting press, the feeding means and the locking means, two distributors inserted in the hydraulic circuit, controlled by the second section of the free wheel clutch and controlling the cycle including in succession the angular movement of the support by one elementary recess spacing to shift a mold into registry with the injection station, the locking in its closed position of the mold registering with the injection station and the operation of the components of the injection station, and means for manually starting said cycle of operations.

3. A rotary machine for the successive molding through injection of a series of small parts of plastic material over metal inserts, comprising a rotary support provided at its periphery with a plurality of equally spaced recesses, driving means for shifting said support through successive angles equal to the spacing between successive recesses, a mold adapted to carry an insert and fitted in each recess to rotate with the support along an annular path and to stop therewith at the end of each angular shifting in predetermined positions, each mold including two sections adapted to be shifted apart, springs urging the mold sections into engagement, means locking each mold in its closed position when registering with one predetermined position, a stationary injecting station facing last-mentioned position of the molds and including an injection chamber adapted to be shifted radially towards the mold registering with said injecting station to engage the mold, means feeding plastic material into said chamber, an injection nozzle at the end of the chamber facing the mold registering with the station, a flap valve closing said nozzle and adapted to be shifted into an inoperative position upon engagement of the chamber with said mold, an injecting press urging the material with the chamber forwardly towards the mold, and then through the nozzle into the latter, a stationary unloading and reloading station facing another predetermined position of the molds and including means for opening the successive molds entering said station to allow removal of the molded part formed therein and introduction into the mold of the insert over which a part is to be molded, means for urging the two sections of each mold together at the injecting station and during the travel of said mold from the injecting station to the unloading station, a hydraulic system controlling the driving means, the injecting press, the feeding means and the locking means, means controlled by the hydraulic system returning the press into its inoperative starting position after each injection, a further distributor inserted in the hydraulic circuit and controlling the operation of the feeding means, and means whereby said further distributor is controlled automatically by the return of the piston press into its starting position.

4. A rotary machine for the successive molding through injection of a series of small parts of plastic material over metal inserts, comprising a rotary support provided at its periphery with a plurality of equally spaced recesses, driving means for shifting said support through successive angles equal to the spacing between successive recesses, a mold adapted to carry an insert and fitted in each recess to rotate with the support along an annular path and to stop therewith at the end of each angular shifting in predetermined positions, each mold including two sections adapted to be shifted apart, springs urging the mold sections into engagement, means locking each mold in its closed condition when registering with one predetermined position, a stationary injecting station facing the mold in last mentioned one position, and including an injection chamber adapted to be shifted radially towards the mold registering with said injecting station to engage the mold, means feeding plastic material into said chamber, an injection nozzle at the end of the chamber facing the mold registering with the station, a flap valve closing said nozzle and adapted to be shifted into an inoperative position upon engagement of the chamber with said mold, an injecting press adapted to urge the material with the chamber forwardly towards the mold and then to inject the material through the nozzle into the latter, a stationary unloading and reloading station facing another predetermined position of the molds and including means for opening the successive molds entering said station to allow removal of the molded part formed therein and introducing into the mold of the insert over which a part is to be molded, means for urging the two sections of each mold together at the injecting station and during the travel of said mold from the injecting station to the unloading station, a hydraulic system controlling the driving means, the injecting press, the feeding means and the locking means, means locking the feeding means against operation during operation of the mold, means controlled by the hydraulic system returning the press into its inoperative starting position after each injection and simultaneously releasing the locking means, a further distributor inserted in the hydraulic circuit and controlling the operation of the feeding means, and means whereby said further distributor is controlled automatically by the return of the piston press into its starting position.

5. A rotary machine for the successive molding through injection of a series of small parts of plastic material over metal inserts comprising a rotary support provided at its periphery with a plurality of equally spaced recesses, driving means for shifting said support through successive angles equal to the spacing between successive recesses, a mold adapted to carry an insert and fitted in each recess to rotate with the support along an annular path and to stop therewith at the end of each angular shifting in predetermined positions, each mold including two sections adapted to be shifted apart, springs urging the mold sections into engagement, means locking each mold in its closed condition with registering with one predetermined position, a stationary injecting station facing last mentioned position of the molds and including an injection chamber adapted to be shifted radialy towards the mold registering with said injecting station to engage the mold, means feeding plastic material into said chamber, an injection nozzle at the end of the chamber facing the mold registering with the station, a flap valve closing said nozzle and adapted to be shifted into an inoperative position upon engagement of the chamber with said mold, an injecting press adapted to first urge the material with the chamber forwardly towards the mold, and then to inject the material through the nozzle into said mold, a stationary unloading and reloading station facing another predetermined position of the molds and including means for opening the successive molds entering said station to allow removal of the molded part formed therein and introduction into the mold of the insert over which a part is to be molded, means for urging the two sections of each mold together at the injecting station and during the travel of said mold from the injecting station to the unloading station, a hydraulic system controlling the driving means, the injecting press, the feeding means and the locking means and two throttling valves inserted in the hydraulic system and adjusting respectively the duration of injection and the speed of angular shifting of the support.

References Cited in the file of this patent

UNITED STATES PATENTS

| | | |
|---|---|---|
| 2,333,056 | Thoreson | Oct. 26, 1943 |
| 2,327,227 | Tucker | Aug. 17, 1943 |
| 2,329,346 | Goff | Sept. 14, 1943 |
| 2,422,990 | Spanier | June 24, 1947 |
| 2,840,854 | Sherman | July 1, 1958 |
| 2,903,747 | Wucher | Sept. 15, 1959 |